No. 660,997. Patented Oct. 30, 1900.
J. T. NICOLSON.
COOLING MEANS FOR MOTOR COMPRESSORS.
(Application filed Sept. 12, 1900.)
(No Model.) 2 Sheets—Sheet 1.
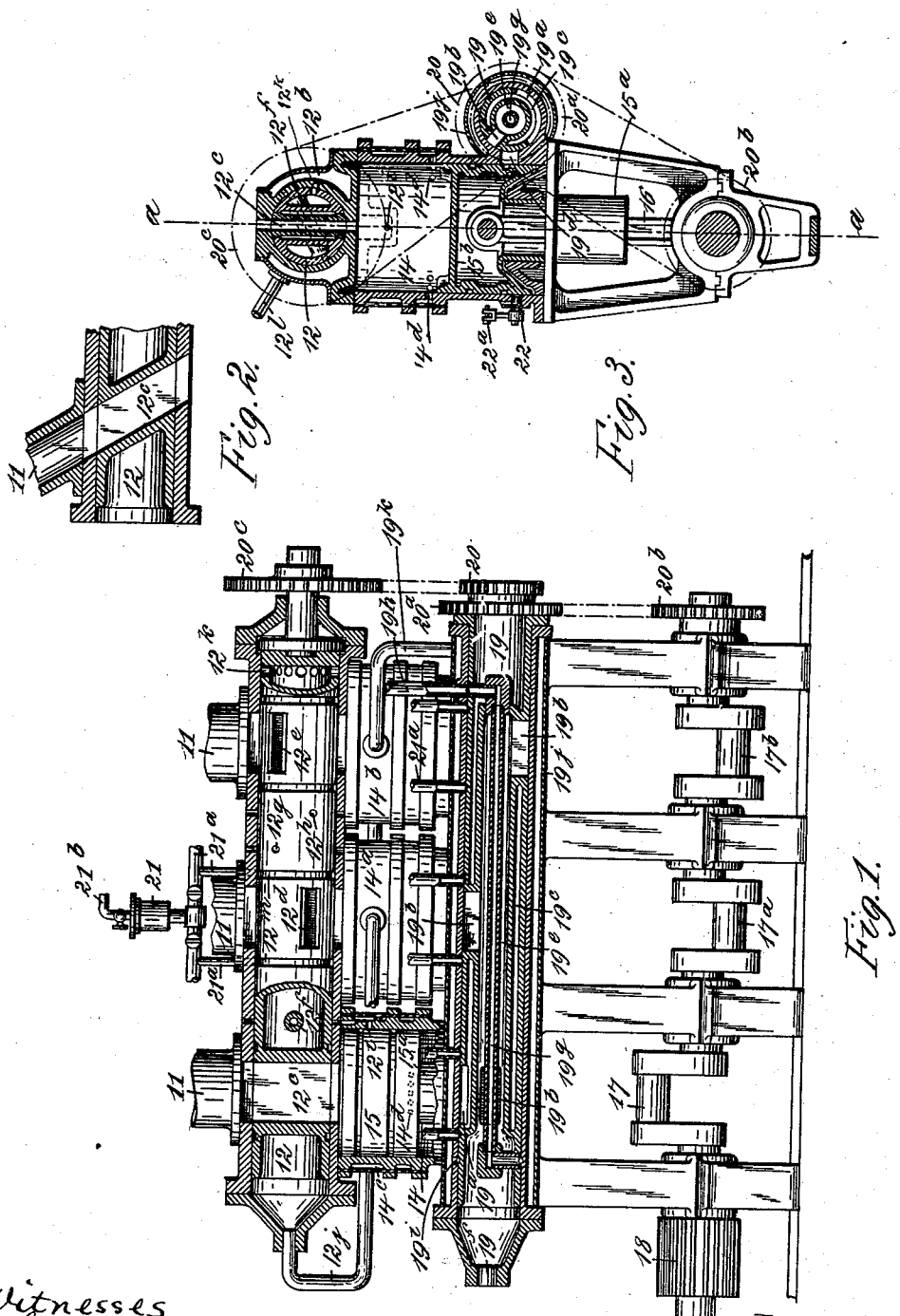
Witnesses
Frank A. Obu
Frank M. Ashley
Inventor:
John Thomas Nicolson
by Wm. A. Rosenbaum
Atty.

No. 660,997. Patented Oct. 30, 1900.
J. T. NICOLSON.
COOLING MEANS FOR MOTOR COMPRESSORS.
(Application filed Sept. 12, 1900.)
(No Model.) 2 Sheets—Sheet 2.
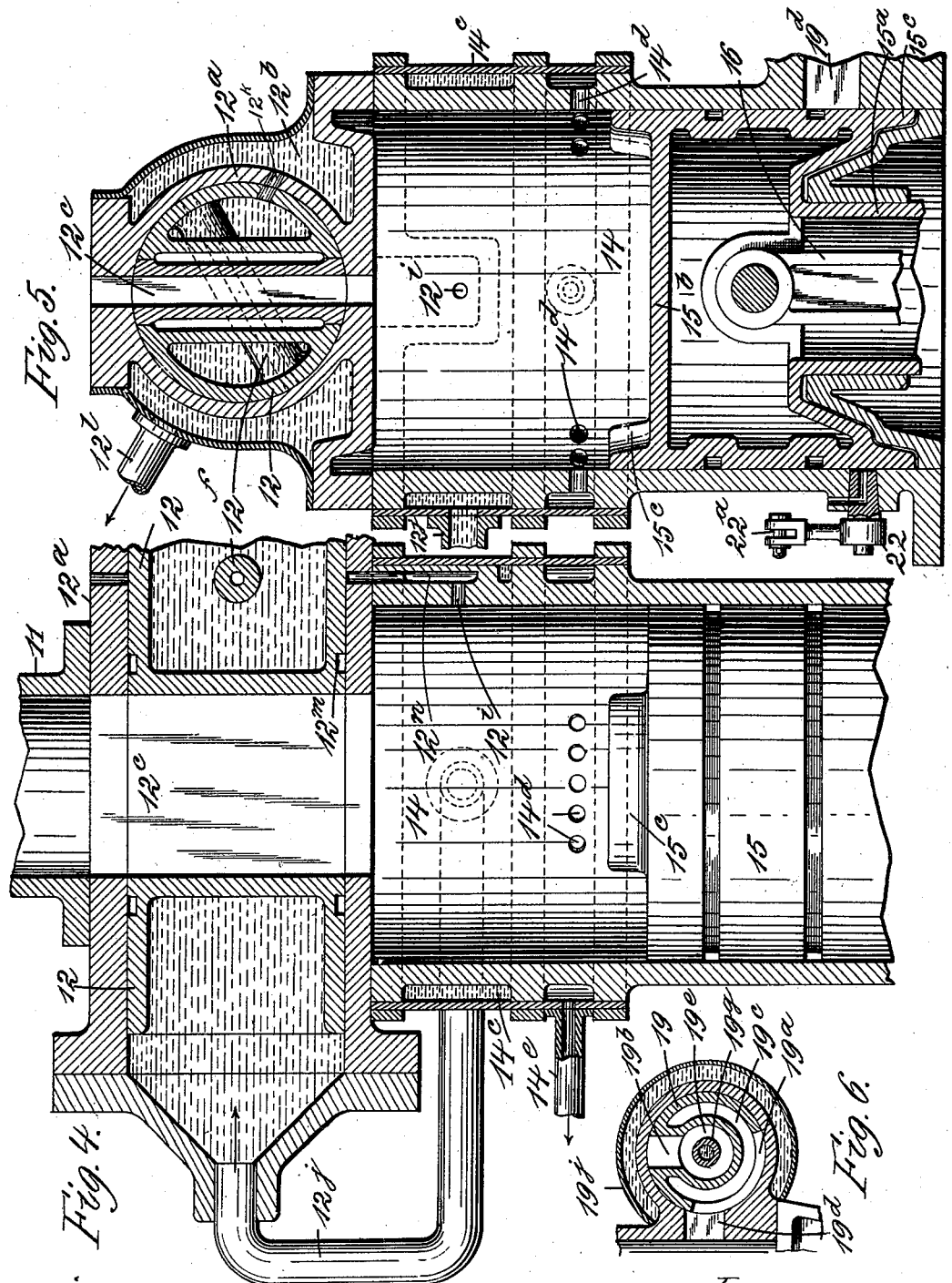

UNITED STATES PATENT OFFICE.

JOHN THOMAS NICOLSON, OF MANCHESTER, ENGLAND.

COOLING MEANS FOR MOTOR-COMPRESSORS.

SPECIFICATION forming part of Letters Patent No. 660,997, dated October 30, 1900.

Application filed September 12, 1900. Serial No. 29,759. (No model.)

*To all whom it may concern:*

Be it known that I, JOHN THOMAS NICOLSON, D. Sc., a subject of the Queen of Great Britain, residing at Manchester, in the county of Lancaster, England, have invented certain new and useful Improvements in Valve-Gear for Motor-Compressors, of which the following is a full, clear, and exact description.

Joule in 1851 suggested the production of power by a scheme involving the use of compressed air, a heating receiver or furnace, and a motor, the motor being supplied by heated compressed air from the receiver. A part of the work done by the motor was to have been employed to compress the air and the balance to have been utilized for driving any suitable mechanism. Since that date many others have devoted much time and attention to the development of the scheme, but mechanical difficulties have hitherto rendered fruitless all efforts to obtain commercial success. Some of these difficulties are overcome by my present invention, which relates to the valve-gear of the motor and air-compressor.

My improved system, to which the hereinafter-described improvements appertain, is fully described in the application for Letters Patent, Serial No. 19,337, filed June 6, 1900. In the production of power by my said system I first compress air to a high pressure by means of a compressor actuated by a hot-air motor. I then heat the air so compressed, and finally deliver the hot air to the motor and utilize it therein both for compressing air and for external work. A single motor and a single compressor are contained in a single cylinder; but usually I employ a plurality of motors and compressors either in simple or in compound arrangement. The air to be compressed may be drawn either from the atmosphere or from a cooling-reservoir into which the motor discharges. After compression it is delivered to a storage-reservoir, whence it is led to a heating device, in which it is highly heated before its admission to the motor. The motor and compressor valves are separate water-cooled rotary valves positively driven from the main or crank shaft. The cooling-water circulates through the compressor-valve, jackets surrounding the cylinders, and the motor-valves.

In the accompanying drawings, Figure 1 shows a longitudinal section along the centers of the valves and one of the cylinders of a three-cylinder motor-compressor; Fig. 2, a partial longitudinal section of a motor-valve, showing a modified construction of the admission-thoroughfare; Fig. 3, a transverse section through one of the cylinders and both valves; Fig. 4, an enlarged view of part of the motor-valve; Fig. 5, an enlarged view of the upper part of Fig. 3, and Fig. 6 a cross-section through the center of the compressor-valve on a larger scale.

In the illustrated construction there are three cylinders in parallel arrangement; but it will be understood that there may be a greater or less number and that a compound or series arrangement may be employed with successive expansions in the motors and successive compressions in the compressors as in other systems. Each cylinder 14 $14^a$ $14^b$ is fitted with a trunk-piston 15, which is connected by a connecting-rod 16 with the cranks 17, $17^a$, or $17^b$. The trunk $15^a$ of each piston is of smaller diameter than the piston, and there is constituted around it in the lower part of the cylinder a closed annular chamber in which the compression of the air is effected by the approaching piston. The hot compressed air enters at the opposite end of the cylinder, where it acts upon the whole area of the piston.

The rotary motor-valve 12 is shown by Fig. 1 to be constructed with thoroughfares $12^c$, $12^d$, and $12^e$, perpendicular to the axis of the valve, giving two admissions for each revolution of the valve. Should it be desired to have only one admission per revolution, a diagonal thoroughfare, as shown by Fig. 2, may be substituted in the construction. The valve is shown to be provided also with subsidiary exhaust-thoroughfares $12^f$, $12^g$, and $12^h$. That part of the valve in which the second and third thoroughfares $12^d$, $12^e$, $12^g$, and $12^h$ are situated is shown in elevation, so as to more clearly illustrate the lubricating-channels hereinafter described. The circulating water enters the valve-casing from the cylinder-jackets by the pipe $12^j$ and passes into the proximate open end of the valve, from which it issues through holes $12^k$ into the lateral valve-jackets $12^b$, finally escaping by the pipe $12^l$.

The cylinder water-jackets $14^a$, $14^b$, and $14^c$ are limited to the upper ends of the cylinders, and in each of them there is constructed a small chamber $12^n$, Figs. 4 and 5, connecting the subsidiary exhaust-outlet $12^i$ with the exhaust-port corresponding with the thoroughfare $12^f$, $12^g$, or $12^h$ in the rotary valve. This subsidiary exhaust serves to diminish the back pressure to give greater efficiency and smoothness of running. The main exhaust-ports are formed by the openings $14^d$ in the walls of each cylinder and are opened and closed by peripheral extensions of the piston. The exhaust opens into the lower part of the cylinder-casing, whence it may escape through the outlet $14^e$, Fig. 4, either to the atmosphere or to a cooler for subsequent use in the compressor.

Motion may be communicated from the crank-shaft to the driven mechanism by the toothed pinion 18.

The rotary compressor-valve 19 has three suction-ports $19^a$ and three discharge-ports $19^b$. The air for the suction enters through the driving chain-wheels 20 and $20^a$ and passes along the annular channel $19^c$ and through the ports $19^a$ and the cylinder-ports $19^d$. The discharged compressed air passes through the ports $19^d$ and $19^b$ into the central cavity $19^e$ of the valve and out through the end outlet $19^f$. The cooling-water enters by the pipe $19^h$, passes along the axial tube $19^g$, at the opposite end of which there is a right-angled bend opening through the surface of the valve, through which a portion of the water escapes once or oftener in each revolution through a port or ports $19^i$ into the valve-jacket $19^j$, whence it passes by the pipe $19^k$ to the water-jacket $14^b$. The water-jackets $14^a$, $14^b$, and $14^c$ being connected by pipes, the water passes successively through them to the pipe $12^j$ and the motor-valve, as already described.

The valves are positively rotated, the compressor-valve by the chain-wheels $20^a$ and $20^b$ with a connecting-chain and the motor-valve by the chain-wheels 20 and $20^c$ and a connecting-chain. The wheel 20 is fast with the wheel $20^a$, and consequently moves therewith.

Lubrication of the motor-valve and of the compressor-valve may be effected through the tubes $21^a$ from the main lubricator 21 or from a plurality of such lubricators. The or each main lubricator 21 has its upper part in open connection through the tube $21^b$ with the compressed-air reservoir, so that the pressure on each side is balanced. Grooves $12^m$ may be turned in the surface of either or both the rotary valves to aid in the distribution of the lubricant.

The lower side of each trunk-piston is provided with peripheral extensions, corresponding with those on the upper side, serving to prevent the outlets $14^d$ from opening into the compressor side of the piston.

The compression parts of the cylinders communicate with a common pipe (not shown in the drawings) through a cock intercalated between each cylinder and the common pipe. It is arranged that these cocks 22 can be simultaneously opened and closed by a common link $22^a$. If the cocks be opened, no compression takes place and the whole work of the motor is available. This part of my invention is more fully described and is claimed in the application for Letters Patent hereinbefore referred to.

Having now described my invention, I declare that what I claim is—

1. In an air-compressor, a rotary compressor-valve having an annular chamber in communication with an end air admission, a port in the outer wall corresponding with a cylinder-port, a central cavity communicating with the delivery-outlet, said cavity having also a port corresponding with the cylinder-port, and a tube forming part of a water-circulating system, substantially as described.

2. In a jacketed rotary valve for an air-compressor, an axial tube surrounded by a space through which the compressed air is delivered, a branch of the said tube at one end opening through the surface of the valve and communicating with a water-admission port, and a second branch at the opposite end of the tube also opening through the surface of the valve and communicating through a port with the water-jacket, substantially as described.

In witness whereof I have subscribed my signature in the presence of two witnesses.

JOHN THOMAS NICOLSON.

Witnesses:
GEO. HEYS,
ARTHUR MILLWARD.